(12) United States Patent
Klein et al.

(10) Patent No.: US 9,195,807 B1
(45) Date of Patent: Nov. 24, 2015

(54) LICENSE MANAGER FOR CENTRAL MANAGEMENT PRODUCTS

(75) Inventors: Bradley Klein, Fort Collins, CO (US); Travis Page Longoria, Fort Collins, CO (US); Toran K. Kopren, Fort Collins, CO (US); James Eugene Wade, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1235 days.

(21) Appl. No.: 12/361,510

(22) Filed: Jan. 28, 2009

(51) Int. Cl.
*G06F 15/173* (2006.01)
*G06F 21/10* (2013.01)
*G06F 21/00* (2013.01)

(52) U.S. Cl.
CPC ........................................ *G06F 21/10* (2013.01)

(58) Field of Classification Search
CPC ........................................................ G06F 21/10

USPC .............................................. 709/225; 705/59
See application file for complete search history.

(56) References Cited

U.S. PATENT DOCUMENTS

| 7,013,294 | B1 | 3/2006 | Sukigawa et al. |
| 7,603,318 | B1 * | 10/2009 | Colosso et al. ................. 705/59 |
| 7,672,972 | B1 * | 3/2010 | Marjadi et al. ................ 707/803 |
| 7,707,288 | B2 * | 4/2010 | Dawson et al. ................ 709/226 |
| 2003/0083998 | A1 * | 5/2003 | Ramachandran et al. ...... 705/59 |
| 2005/0289070 | A1 * | 12/2005 | Takahasi et al. ................ 705/52 |
| 2006/0100962 | A1 * | 5/2006 | Wooldridge et al. ........... 705/50 |
| 2007/0118481 | A1 | 5/2007 | Bostrom et al. |
| 2007/0265976 | A1 | 11/2007 | Helfer et al. |
| 2008/0082450 | A1 * | 4/2008 | Grimm et al. ................... 705/59 |

* cited by examiner

*Primary Examiner* — Wen-Tai Lin
(74) *Attorney, Agent, or Firm* — Clifton L. Anderson

(57) ABSTRACT

A license manager running on a central-management server interacts with a managed node to determine a quantity of licensable units associated with a combination of a central-management program and the selected managed node.

9 Claims, 2 Drawing Sheets

LICENSE MANAGER FOR CENTRAL MANAGEMENT PRODUCTS

BACKGROUND

Data centers and other large computer systems can have many computing resources of many different types such as stand-alone computers, blade systems, rack systems, partition-able complexes, and virtual machines. Central management can assist an administrator in managing such complex systems. However, different data centers have need for different management features; also different computing resources within a data center may have different needs for management features. Accordingly, a variety of management software products may be available "a la carte"; furthermore, an administrator is often able to choose which nodes are to receive the benefit of a particular management product and to what extent.

BRIEF DESCRIPTION OF THE DRAWINGS

The figures depict implementations/embodiments of the invention and not the invention itself.

DETAILED DESCRIPTION

Figure 1:
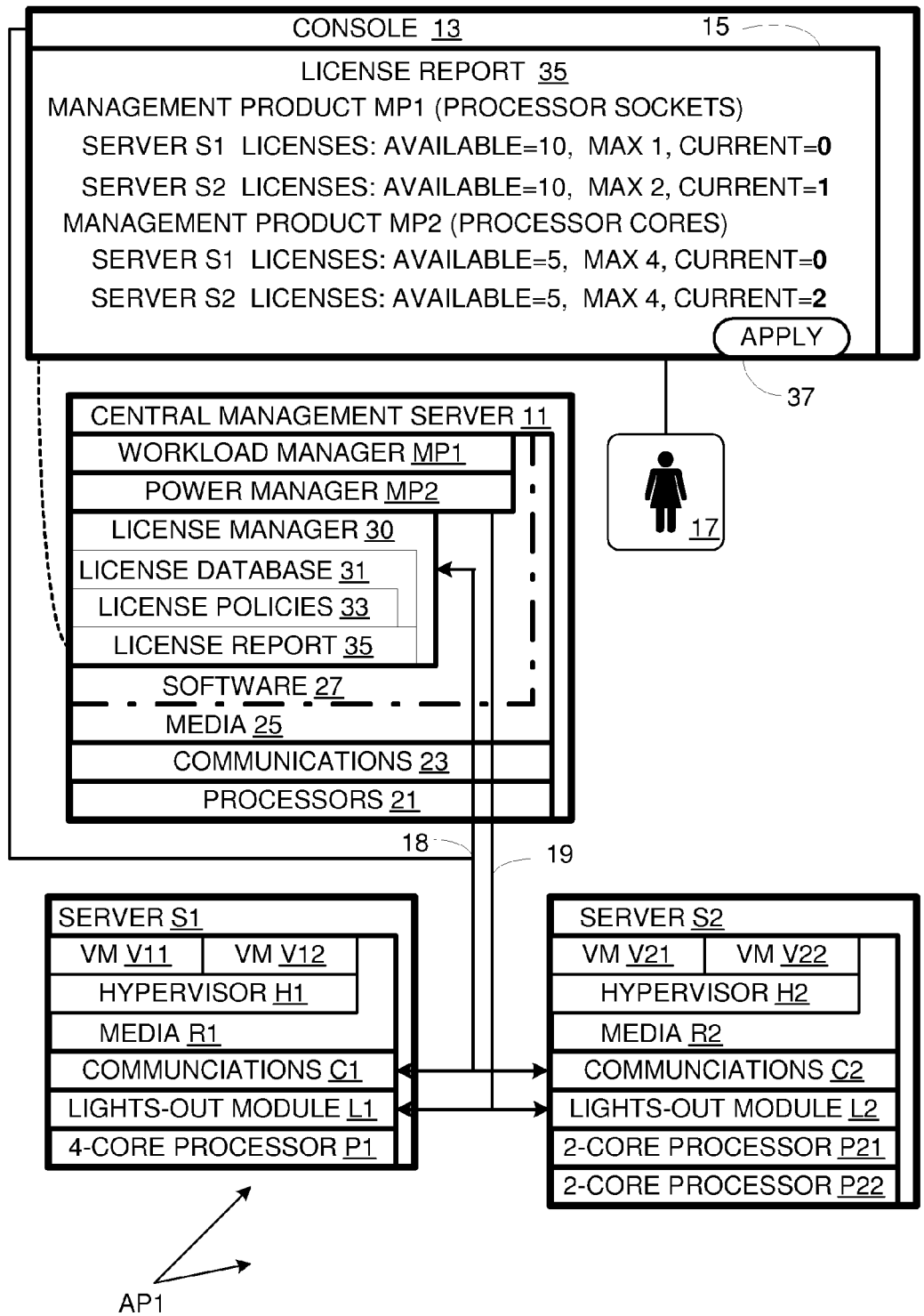
FIG. 1 is a schematic diagram of a computer system in accordance with an embodiment of the invention.

So that a customer for central-management products pays only for features they use, license fees often provide for some "sliding scale". For example, the fees may be lower for less powerful computing resources. However, the way fees are calculated can vary according to management product and according to node specifications. For example, one management product may calculate fees on a per-processor basis while another management product may calculate fees on a per-processor-core basis.

Embodiments of the present invention provide for central management of licenses for central-management products. In at least some of these embodiments, a license manager communicates over a network with managed nodes to determine a maximum quantity of licensing units associated with each combination of management product and licensable node.

In accordance with an embodiment of the invention, a data center AP1 includes stand-alone servers S1 and S2, a central-management server 11, and a console 13, which includes a display 15. A data-center administrator 17 communicates with central-management server 11 via console 13. Central-management server 11 communicates with servers S1 and S2 via an in-band network 18 and over an out-of-band network 19.

Server S1 includes a quad-core processor P1, a lights-out module L1, communications devices C1, and computer-readable storage media R1. Tangibly encoded on media R1 are programs of computer-executable instructions: a hypervisor H1 and virtual machines V11 and V12. Server S2 includes a pair of dual-core processors P21 and P22, a lights-out module L2, communications devices C2, and computer-readable storage media R2. Tangibly encoded on media R2 are programs of computer-executable instructions: a hypervisor H2 and virtual machines V21 and V22. In alternative embodiments, different computing resource types and capabilities and different workloads are involved.

Central-management server (CMS) 11 includes processors 21, communications devices 23, and computer-readable storage media (including hard disks and solid-state memory) 25. Encoded on media 25 is software, e.g., computer-manipulable data and programs of computer-executable instructions. These programs include a license manager 30 and central-management products, e.g., a workload manager MP1 and a power manager MP2. Alternative embodiments provide for different numbers and different types of central-management products. License manager 30 includes a license database 31 that stores, among other data, license policies 33. One of the functions of license manager 30 is to generate license reports such as a license report 35 for presentation on display 17.

Workload manager MP1 allocates workloads to computing resources and vice versa. For example, if server S1 is licensed as a client node for workload manager MP1, workload manager MP1 can monitor utilization of processor P1 by each of virtual machines V11 and V12 and reallocate cores according to the respective requirements of virtual machines V11 and V12. For another example, if server S2 is licensed for both workload manager MP1 and power manager MP2, workload manager MP1 can reduce energy according to budget policies during periods of low demand by virtual machines V21 and V22. Workload manager MP1 can do this by communicating with power manager MP2, which can control power settings (e.g., by having cores enter lower power states) via out-of-band network 19 and lights-out-module L2.

Figure 2:
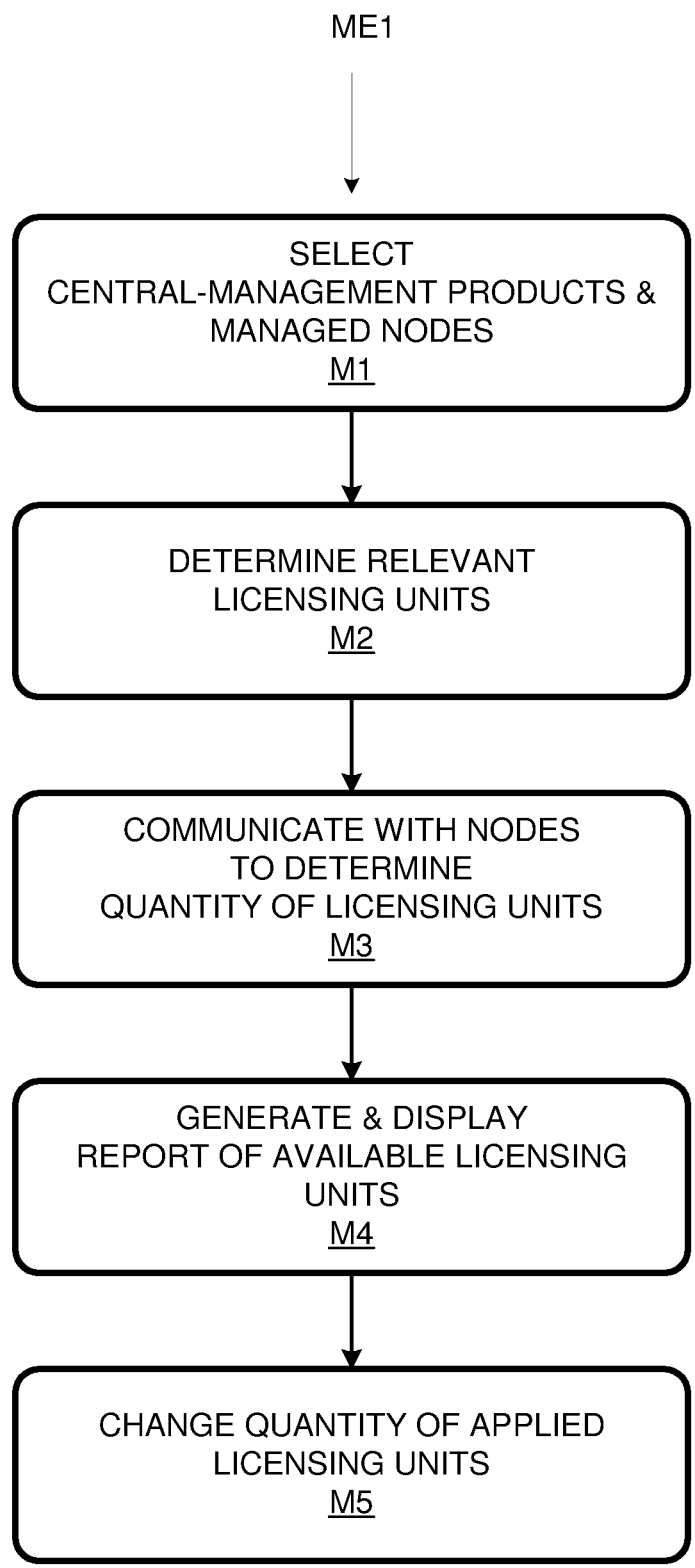
FIG. 2 is a flow chart of a method in accordance with an embodiment of the invention.

A method ME1 for managing licenses for using central-management products such as workload manager MP1 and power manager MP2 is flow charted in FIG. 2. At method segment M1, license manager 30 presents a user interface on console 13 so that administrator 17 can select one or more management products and one or more computing nodes (e.g., servers S1 and S2) to be managed using the selected management products.

At method segment M2, in response to the selections, license manager 30 accesses policies 33 to determine the relevant licensing unit for each combination of selected management product and selected node. For workload manager MP1, the relevant licensing unit is "processors", meaning that licensing fees are tied to the number of processors on the node. For power manager MP2, the relevant licensing unit is "cores", meaning that licensing fees are tied to the number of processor cores on the node.

Alternative embodiments provide for more complex policies in which the licensing units vary according to the node type: for example, the licensing units for a management product can be "blades" for a blade enclosure and "virtual machines" for a virtual-machine host. Other policies may take into account processor clock rates and operating systems involved.

At method segment M3, license manager M3 communicates with the selected computing nodes over in-band network 18 to determine the number (or other quantity) of available computing units as defined by licensing policies 33 for the selected management products. For workload manager MP1 and server S1, the number of available licensing units is equal to the number of processors, in this case one (processor), hosted by server S1. For workload manager MP1 and server S2, the number of available units is two (processors). For power manager MP2 and server S1, the number of available units is four (cores). For power manager MP2 and server S2, the number of available units is four (cores).

At method segment M4, license manager 30 generates a report 35 for presentation of display 35 of console 13. The report indicates number or other quantity (max) of licensable units for each combination of selected central-management products and managed nodes. In addition, for each combination, a number of available licenses (active or reserved) is determined from database 31 and reported. Further, the number of active (current) licenses for a product on a node is indicated.

At method segment M5, license manager 30 permits administrator 17 to change the number or other quantity of active licenses for a combination of product and node. Such a change can be effected by editing the "current" value for that combination, and then activating a graphic object "apply" button 37 on display 15. Method ME1 relieves administrator 17 of much of the complexity involved in managing disparate licensing policies and coordinating them with characteristics of nodes to be managed.

In the illustrated embodiment, the number of compute units is labeled "max" since partial licensing is permitted. In an alternative embodiment, partial licensing is not permitted. In that case, a license manager is used to enforce, communicate, and facilitate licensing compliance with the total number of compute units on a node.

Herein, related art is described to facilitate understanding. Related art labeled "prior art" is admitted prior art; related art not labeled "prior art" is not admitted prior art.

Variations of method ME1 can apply to many types of data centers and other computing systems, various types of management software running on a centralized management system, and various types of nodes. While the illustrated management products were licensed on a per-processor, or per-core basis, other products may be managed on a per virtual machine, per hyperthread, per blade, per blade enclosure, per MIP (millions of instructions per second), per partition, per memory unit, per network bandwidth unit, etc. Also, a given management product may have different units for different types of managed nodes. These and other variations upon and modifications to the illustrated embodiments are provided by the present invention, the scope of which is defined by the following claims.

What is claimed is:

1. A system comprising non-transitory computer-readable storage media encoded with license-manager code, said license-manager code being configured to, when executed by a processor:
   select a first managed node of plural managed nodes, said first managed node having a first computing resource;
   select a first central-management product for reconfiguring said managed nodes, said first central-management product including software executing on a central-management server coupled to said managed nodes via a network;
   determine a first relevant licensing unit of said first computing resource for said first central-management product, said first relevant licensing unit being relevant to the determination of license fees associated with managing said first managed node using said first central-management product;
   interact with said first managed node to identify a first quantity of said first relevant computing resource available on said first managed node in terms of said first relevant licensing unit; and
   change a number of active licenses for managing said first managed node using said central-management product.

2. A system as recited in claim 1 further comprising said central-management server, said central-management server including said processor, said central-management server including communications devices through which said license manager code communicates with said managed nodes.

3. A system as recited in claim 1 further comprising selecting a second central-management product including software executing on said central-management server;
   the determining including determining a second relevant licensing unit for said second central-management product; and
   the interacting including identifying a second quantity in terms of said second relevant licensing unit of said computing resources available on said first managed node, said second quantity being different from said first quantity.

4. A system as recited in claim 3 further comprising selecting a second managed node, said first and second managed nodes having equal quantities of resources available in terms of said first relevant licensing unit and unequal quantities of resources available in terms of said second relevant licensing unit.

5. A system as recited in claim 2 wherein said first and second licensing units collectively include one or more of the following: processors, processor cores, virtual processors, and hyperthreads.

6. A computer-implemented method comprising the following computer-implemented actions:
   selecting a first managed node of plural managed nodes, said first managed node having a first computing resource;
   selecting a first central-management product for reconfiguring said managed nodes, said first central-management product including software executing on a central-management server coupled to said managed nodes over a network;
   determining a first relevant licensing unit of said first computing resource for said first central-management product, said licensing unit being relevant to the determination of license fees associated with managing said first managed node using said first central-management product;
   communicating with said first managed node over said network to identify a first quantity of said first computing resource available on said first managed node in terms of said first relevant licensing unit;
   generating and displaying in human-readable form a report of said quantity in association with said first central-management product and said first managed node;
   changing a number of active licenses for a combination of said first central-management product and said first management node; and
   using said first central-management product executing on said central-management server to reconfigure said first managed node.

7. A method as recited in claim 6 further comprising selecting a second managed node managed by said central-management server, said communicating including communicating over said network with said second managed node to identify a second quantity of resources available on said second managed node in terms of said first relevant licensing unit.

8. A method as recited in claim 7 further comprising selecting a second central-management product executing on said central-management server, said determining including determining a second relevant licensing unit for said second central-management product, said communicating including communicating with said managed nodes to identify
   a third quantity of resources available on said first node in terms of said second relevant licensing unit, and
   a fourth quantity of resources available on said second managed node in terms of said second relevant licensing unit, said first and third quantities being equal, said second and fourth quantities being different.

9. A method as recited in claim 8 wherein said first and second licensing units collectively include one or more of the following: processors, processor cores, virtual processors, and hyperthreads.

\* \* \* \* \*